May 20, 1947.　　　　R. E. PETERSON　　　　2,420,681
METHOD OF AND APPARATUS FOR EXTRACTING JUICE FROM WHOLE CITRUS FRUIT
Filed Oct. 8, 1945　　　12 Sheets-Sheet 1

FIG. 1.

ROBERT E. PETERSON
INVENTOR.

BY

ATTORNEY

May 20, 1947.    R. E. PETERSON    2,420,681
METHOD OF AND APPARATUS FOR EXTRACTING JUICE FROM WHOLE CITRUS FRUIT
Filed Oct. 8, 1945    12 Sheets-Sheet 2

FIG. 2

ROBERT E. PETERSON
INVENTOR.

BY
ATTORNEY

May 20, 1947.  R. E. PETERSON  2,420,681
METHOD OF AND APPARATUS FOR EXTRACTING JUICE FROM WHOLE CITRUS FRUIT
Filed Oct. 8, 1945  12 Sheets-Sheet 3

FIG. 3.

ROBERT E. PETERSON
INVENTOR

BY
ATTORNEY

May 20, 1947.  R. E. PETERSON  2,420,681
METHOD OF AND APPARATUS FOR EXTRACTING JUICE FROM WHOLE CITRUS FRUIT
Filed Oct. 8, 1945    12 Sheets-Sheet 7

ROBERT E. PETERSON
INVENTOR.

BY 
ATTORNEY

May 20, 1947.   R. E. PETERSON   2,420,681
METHOD OF AND APPARATUS FOR EXTRACTING JUICE FROM WHOLE CITRUS FRUIT
Filed Oct. 8, 1945   12 Sheets-Sheet 8

ROBERT E. PETERSON
INVENTOR.

BY 
ATTORNEY

May 20, 1947. R. E. PETERSON 2,420,681
METHOD OF AND APPARATUS FOR EXTRACTING JUICE FROM WHOLE CITRUS FRUIT
Filed Oct. 8, 1945 12 Sheets—Sheet 10

ROBERT E. PETERSON
INVENTOR
BY

ATTORNEY

May 20, 1947. R. E. PETERSON 2,420,681
METHOD OF AND APPARATUS FOR EXTRACTING JUICE FROM WHOLE CITRUS FRUIT
Filed Oct. 8, 1945 12 Sheets-Sheet 11

ROBERT E. PETERSON
INVENTOR.

BY 
ATTORNEY

Patented May 20, 1947

2,420,681

UNITED STATES PATENT OFFICE 2,420,681

METHOD OF AND APPARATUS FOR EXTRACTING JUICE FROM WHOLE CITRUS FRUIT

Robert E. Peterson, Los Angeles, Calif., assignor to Food Machinery Corporation, San Jose, Calif., a corporation of Delaware Application October 8, 1945, Serial No. 621,153

30 Claims. (Cl. 100—50)

This invention relates to the art of extracting juice from fruits and the like and is particularly useful in extracting juice from citrus fruit.

It is an object of my invention to provide a novel and practicable method of and apparatus for extracting juice from fresh whole citrus fruit.

It is another object of my invention to provide a novel apparatus for extracting juice from whole citrus fruit through a hole in the rind which will function during the pressing operation to support all portions of the rind of the fruit outside the area of the hole in the rind so as to prevent the juice under pressure within the fruit from bursting through the rind elsewhere than through said hole.

It is yet another object of my invention to provide an apparatus for extracting juice from fresh whole citrus fruit which is adapted for installation and operation in restaurants, soda fountains, lunch counters and the like for the production of juice as this is ordered by the customers.

The manner of accomplishing the foregoing objects, as well as further objects and advantages, will be made manifest in the following description taken in connection with the accompanying drawings in which:

Fig. 24 is a view similar to Fig. 23 with the upper jaw lowered and held closed by the jaw closing cam. This view shows how this action has pressed the orange on the annular cutter surrounding the juice outlet in the lower cup so as to cut a button out of the rind of the fruit, thereby forming a hole for extraction of juice from the whole fruit. This view also shows the reaction of the rubber diaphragms to the initial introduction of fluid under pressure into the pressure chambers causing the diaphragms to closely conform to the fruit trapped therebetween. It is noted that all portions of the rind of the fruit, except the rind button disposed within the cutter, are pressurably supported so that no outward bursting of the juice through the rind can possibly occur when further pressure is applied to the fruit.

Referring specifically to the drawings, the preferred form of apparatus illustrated therein comprises a juice extractor 30. This extractor is designed for use in extracting juice from whole citrus fruit at soda fountains, lunch counters and the like. The mechanism of the extractor 30 is ordinarily covered with a housing, this being omitted in the drawings to expose the working parts for the purposes of this disclosure.

The extractor 30 has a base 31 which may be in the form of a hardwood board or be fabricated of sheet metal. Secured to the base 31 by bolts 32 is a lower frame section 34 having a front wall 35 and side walls 36.

Resting on top of the lower frame section 34 is an upper frame section 40 having a front wall 41, side walls 42 and 43 and a floor 44, the latter having an intermediate wall 45 on which is provided a bearing 46. Aligned with this bearing on walls 42 and 43 are bearings 47 and 48. A cam shaft 49 is journalled in these bearings. The upper frame section 40 is secured to the lower frame section 34 as by screws 50.

The upper frame section 40 has a lower jaw 55 formed integral therewith, this jaw having a horizontal upper face 56 from the rear edge of which hinge ears 57 extend upwardly and rearwardly. Formed downwardly in the face 56 is a pair of cup-like recesses 58 which are identical so that a description of one will suffice for both. The construction of each of these cups and the manner in which each is equipped is illustrated in Figs. 23 to 26 inclusive.

Each recess 58 has a central hole 59 which is provided with a lower counter-bore 60. The recess 58 also has an upper, undercut counter-bore 61 into which is fitted the correspondingly shaped rim of a soft rubber diaphragm 62, the form of which is indicated in Figs. 23 to 26 inclusive. The diaphragm 62 has an expanding steel ring 65 in an annular pocket formed in the rim of the diaphragm so as to expand the latter into the undercut counter-bore 61.

The diaphragm 62 has a cup-like body 66 on which annular ribs 67 are formed outward, these terminating at their edges with rings 68 of cord which are vulcanized into these flanges for strengthening purposes. Formed centrally in the diaphragm body 66 is a hole 69 which is surrounded by a fabric reinforcing washer 70, this being vulcanized to the diaphragm. Extending downwardly through the holes 69 and 59 is a juice passage tube 71 having an external flange 72 at its upper end and which is externally threaded to receive a nut 73, the latter entering the counter-bore 60 and being tightened to clamp the central portion of the diaphragm body 66 between the flange 72 and the fixed jaw 55. A counter-bore 74 in the upper end of the tube 71 provides a seat into which an annular cutter or juice nozzle 75 is pressed. As clearly shown, this cutter has a sharp cutting edge at its upper end, the purpose of which will be made clear hereinafter.

The two recesses 58 in the fixed jaw 55 are connected by a passage 78. Also formed in the fixed jaw 55 is a pressure control passage 79 which leads to one of the recesses 58. Screwed into the outer end of this passage is a nipple 80.

Hingedly connected to the fixed jaw 55 is an upper swingable jaw 81, the hinge comprising ears 82 formed thereon and a pin 83 which extends through these ears and the ears 57 on the fixed jaw 55. The jaw 81 is adapted to swing between an upward position in which it is shown in Figs. 18, 19, 20 and 23 and a downward position in which it is shown in Figs. 1, 2, 3, 4, 6, 9, 12, 15, 24, 25 and 26. The upper jaw 81 has a horizontal lower face 84 which is disposed horizontally in snug face to face contact with the horizontal face 56 of the lower jaw 55 when the jaw 81 is swung into its lower position.

The upper jaw has two hemispherical recesses 85 formed upwardly in the face 84, these recesses being of the same diameter as the recesses 58 in the lower jaw and being positioned to match with the lower recesses when the jaw 81 is closed. The recesses 85 have undercut counter-bores 86 identical with the counter-bores 61 in the lower jaw and are joined by a passageway 87 formed in the jaw 81. Also formed in the jaw 81 (Fig. 1) is a pressure control conduit 88, the outer end of which has a hose nipple 89 and connects at its inner end with one of the recesses 85.

Mounted in each of the recesses 85 is a flexible rubber diaphragm 90 which is substantially identical with the diaphragm 62 so that the rim thereof fits into the undercut counterbore 86 and is held therein by a strongly expanding spring ring 91. The diaphragm 90 has a cup-shaped body 92 with cord-tipped external annular flanges 93 and has a central opening 94 which is closed by a flanged button 95 which is clamped in place by a stud screw 96, nut 97 and washer 98. Cemented in a shallow recess 99 in the button 95 is a rubber disc 100, the purpose of which will be made clear hereinafter.

The upper jaw 81 has a handle 105 extending forwardly therefrom which is capped with a ball 106. This is adapted to be gripped in the hand to control the operation of the machine 30. The jaw 81 also has a latch dog 107 fixed thereon and extending rearwardly therefrom for a purpose to be made clear hereinafter.

Formed centrally on the jaw 81 and extending rearwardly therefrom is a bifurcated arm 108 within the fork of which is pivotally mounted a cam responsive roller 109. Fixed on the arm 108 is a spring arm 112 which is connected by a contractile coil spring 113 to post 114 mounted on the opposite end of the base 31.

Fixed to the floor 44 in downwardly spaced relation therewith is a valve supporting plate 115 in which are mounted a pressure valve 116 and an exhaust valve 117. These valves are normally closed and have stems 118 which are spring pressed upwardly when the valves are closed and which operate when depressed to open these valves. Journaling in a bearing 119 which is mounted on the floor 44 and in a suitable hole provided in the wall 45 is a rocker shaft 121 on which rockers 122 and 123 are mounted. Each of these rockers has a horizontal arm 124 and a vertical arm 125, the arms 124 overlying stems 118 of the valves 116 and 117.

Connecting to the intake end of the valve 116 is a pipe 130 through which water or other fluid may be delivered to the machine 30 under high pressure. The discharge end of the exhaust valve 117 connects with an exhaust pipe 131. The discharge end of the valve 116 and the intake end of the valve 117 are connected by fittings 132 and 133 to T-fittings 134 and 135 which are connected by a nipple 136. The T-fitting 134 has a nipple 137 which is connected by a high pressure hose 138 to the hose nipple 89 on the upper jaw 81. The T-fitting 135 connects through fittings 139 to a nipple 140 which is connected by a copper tube 141 with the nipple 80 shown in Fig. 2.

Fixed on the cam shaft 49 just inside the wall 43 is a switch cam 146. Also fixed on this shaft in operative alignment with the rockers 122 and 123 respectively are a pressure cam 147 and an exhaust cam 148. Rotatably mounted on the shaft 49 on the opposite side of the bearing 46 from the cam 148 is a jaw closing cam 149. Fixed on the shaft 49 adjacent said cam is a jaw cam operating device 150. Secured to the floor 44 by bolts 151 are bearing blocks 152, certain of these bolts also securing to said floor a standard 153 which supports at its upper end a stationary cam 154.

Figures 20, 21, 22:
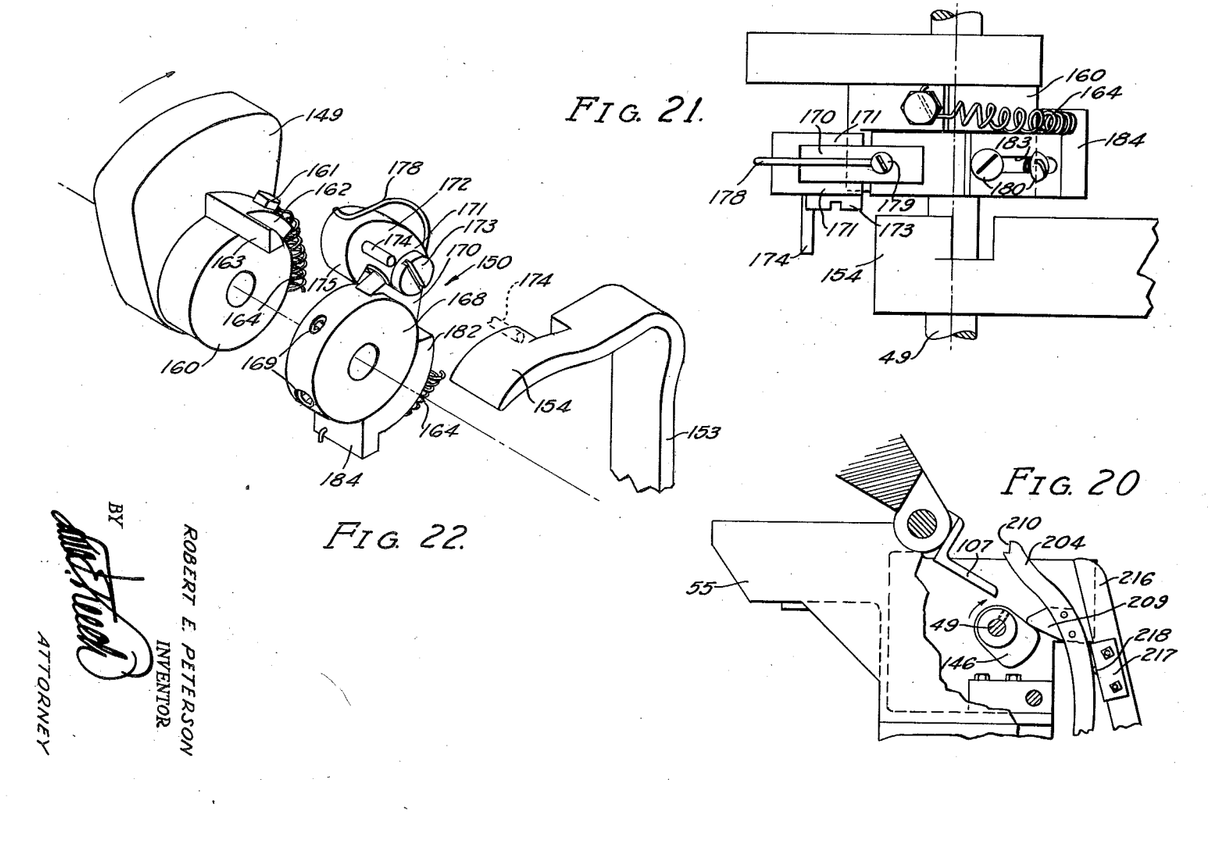
Fig. 20 is a fragmentary view similar to Fig. 19 and showing the switch cam of the invention as this permits the switch-actuating jaw-latching lever to return inwardly a sufficient distance to cause the motor switch to open.
Fig. 21 is an enlarged fragmentary detail plan view of the jaw closing cam and operating mechanism thereof with the parts thereof disposed as shown in Fig. 9.
Fig. 22 is an expanded perspective view of the elements of the jaw closing cam and its operating mechanism spaced abnormally from each other along the axis of the cam shaft of the invention so as to clearly reveal the construction of these parts and their operating relation as shown in Fig. 12.

As shown in Fig. 22, the cam 149, the device 150 and the cam 154 are cooperatively related to each other. The cam 149 has a hub 160 extending therefrom towards the device 150 and a screw 161 secures to this hub an arcuate plate 162 having a finger 163 extending therefrom axially beyond the end of the hub 160. One end of a coiled contractile spring 164 is secured to the screw 161.

The device 150 comprises a collar 168 which is of the same diameter as the cam hub 160 and is fixed to the shaft 49 directly alongside said hub as by set screws 169. Extending from the collar 168 is an ear 170 which extends between and is pivotally connected to fork arms 171 of a latch 172 by a screw 173. The latch 172 has a cam follower pin 174 and a rounded nose 175, the purpose of which will be made clear hereinafter. The latch 172 is yieldably swung inwardly by a wire spring 178 which is fixed to the ear 170 by a screw 179.

Secured to the collar 168 by screws 180 is an arcuate plate 182. The screws 180 extend through a slot 183 which permit rotational adjustment of the plate 182 on the collar 168. Formed on one end of the plate 182 is a lug 184, one end of which overlies the cam hub 160 and has the opposite end of the coiled spring 164 connected thereto. While for illustrative purposes, the cam 149, the device 150 and the cam 154 are shown as spaced abnormally in Fig. 22 it is to be understood that when assembled together in the machine 30 these parts are disposed close to one another on the shaft 49 and, in one position of this shaft, appear as shown in Fig. 21.

Fixed on the shaft 49 just to the left of the standard 153 is a driven worm gear 187 which meshes with a worm 188 fixed on a shaft 189 which journals in the bearing blocks 152. Provided in the floor 49 is an opening 190 into which a sprocket 191 extends, the latter being fixed on the shaft 189. This sprocket is connected by a chain 192 to a drive pinion 193 provided on the shaft 195 of an electric motor 196 which is secured by screws 197 to the base 31 of the machine.

The wall 35 has bearing blocks 200 provided thereon in which is journalled a shaft 201. This shaft has fixed thereto a jaw latching switch actuating arm 204 which is pulled towards the cam shaft 49 by a contractile spring 207 which connects to an eye 208 provided in the wall 35. (See Fig. 6.)

Opposite the cam shaft 49, the arm 204 has a cam follower lug 209 and at its upper extremity is provided with a notch 210, the latter being disposed opposite the upper jaw latching dog 107.

Secured at its lower end as by screws 215 to the base 31 is a flexible switch support 216 which is formed of strap metal and extends upwardly so that its upper end lies just inside of and against the inner face of the wall 43 of the upper frame section 40. (See Fig. 6.)

Bolted to the support 216 is a micro-switch 217 having a switch button 218 which is spring pressed outwardly to open said switch. The button 218 is so positioned as to bear against the rear face of the arm 204. The switch support 216 is so mounted that when the arm 204 is moved towards the cam shaft 49 past a given position, the pressure between this arm and the button 218 will decrease to where this button will be spring pressed outwardly from the switch 217 so as to open the latter. On the other hand, a movement of the arm 204 away from the cam shaft 49 past a given position will increase the pressure between this arm and the button 218 to press the latter into the switch 217 thereby closing this switch. The motor 196 is supplied with electricity through an electric cord 220, the electric circuit of the motor including the switch 217 so that when this switch is closed, the motor 196 is energized and when the switch opens the motor is de-energized.

*Operation*

The juice extractor 30, as above stated, is designed for use in eating places for the production of citrus juice from whole citrus fruit as this is ordered by the customers. When installed for this purpose, the machine 30 is provided with a suitable housing covering the working parts thereof above and to the rear of the frame sections 34 and 40 yet permitting the upper jaw 81 freedom to swing upwardly as shown in broken lines in Fig. 2 and in full lines in Figs. 19 and 23.

Figures 5, 6:
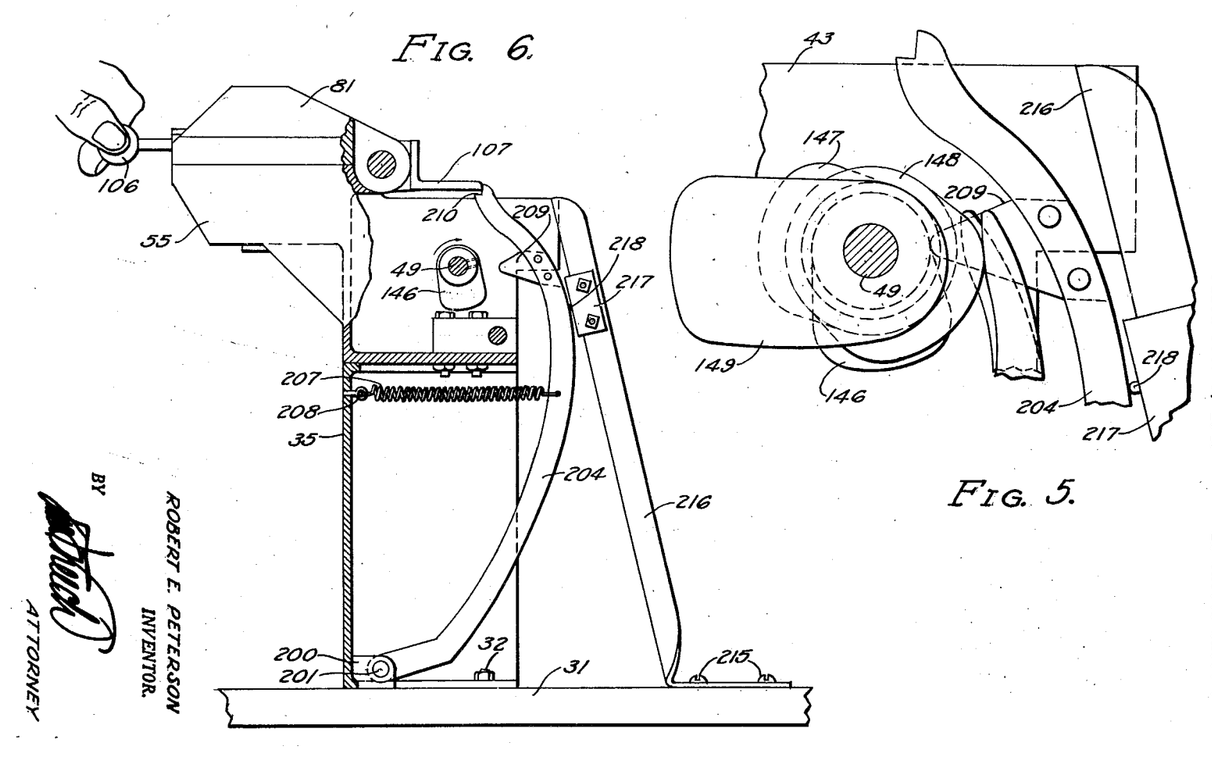
Fig. 5 is an enlarged diagrammatic illustration of the cam shaft of the invention in section and the various cams carried by said shaft as the latter are disposed in Figs. 1, 2, 3, and 4, which is to say, in the positions they have on said shaft when the latter is motionless in between juice extracting operations.
Fig. 6 is a view similar to Fig. 2 with all of the structure adjacent the switch operating cam broken away so as to expose said cam to view in the same position as this is shown in Fig. 5.

The mechanism of the juice extractor 30 is normally stationary with the motor 196 de-energized and with the jaw 81 elevated in open position. At this time, the cams on the cam shaft 49, the arm 204, and the switch support 216 are all disposed as shown in Fig. 5. The cord 220 is connected to a suitable supply of electricity and the pipe 130 is connected to a suitable supply of water under a pressure of from 125 to 300 pounds per square inch. While a good juice extraction job can be done with a pressure of 125 pounds, a more nearly complete removal of the juice is effected with a pressure approaching the higher limit indicated.

Figure 23:
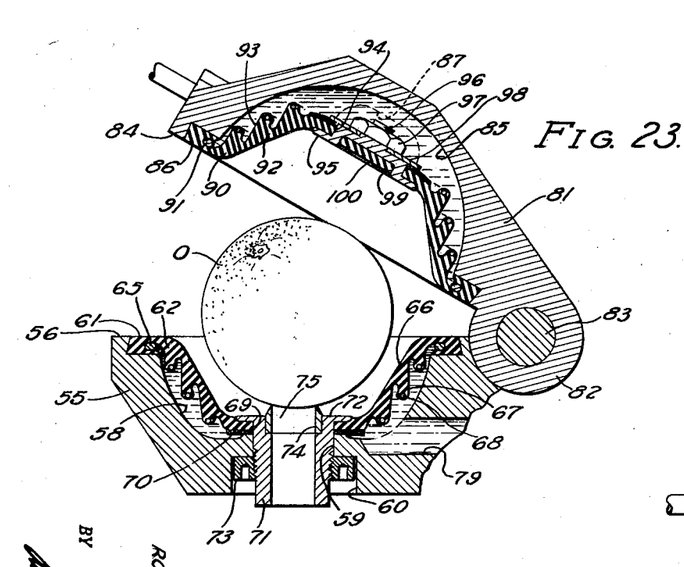
Fig. 23 is an enlarged sectional view taken through the swingable upper and the fixed lower jaws of the invention on the axes of a pair of juice extracting cups provided therein, showing the upper jaw lifted in inoperative position and with an orange inserted in the lower cup in readiness for commencing a juice extracting operation.

Each juice extracting operation begins by the insertion into each of the cups formed by the diaphragms 62 in the lower jaw 55 a whole citrus fruit such as the orange O shown in Fig. 23. Such an orange when thus inserted comes to rest on top of the juice nozzle 75 in the bottom of the cup.

The operator then seizes the ball 106 on the jaw 81 and swings this jaw downwardly into closed position as shown in Figs. 1, 2, 3, 4 and 6. This swings the dog 107 fixed to the jaw 81 upwardly against the switch operating arm 204 so as to swing the latter rearwardly from the position in which it is shown in Fig. 5 to the position in which it is shown in Fig. 6. This movement of the arm 204 causes the latter to press against the switch button 218 as shown in Fig. 6 so as to close the switch 217 and energize the motor 196.

Figure 7:
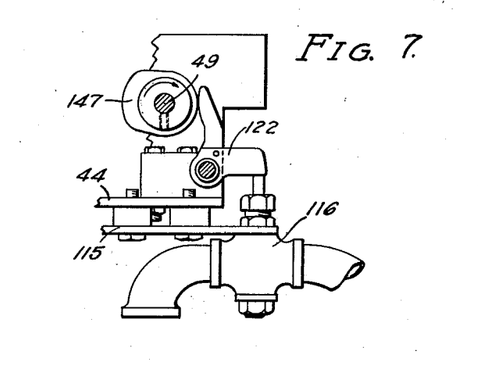
Fig. 7 is an enlarged fragmentary detail view of the fluid pressure valve and its operating cam with the latter disposed as shown in Fig. 5.
Figure 8:
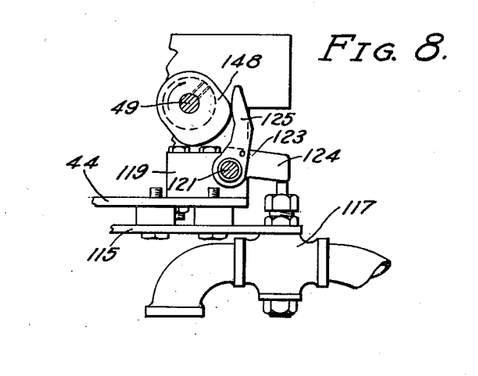
Fig. 8 is an enlarged detail sectional view illustrating the exhaust valve and its operating cam with the latter disposed as shown in Fig. 5.
Figure 9:
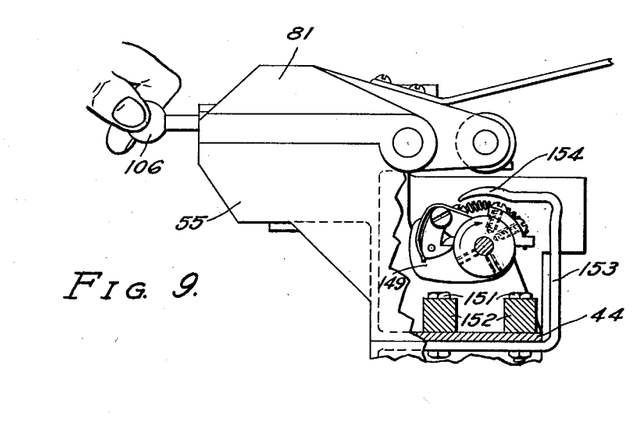
Fig. 9 is a fragmentary detail sectional view illustrating the upper swingable jaw of the invention manually closed and showing the jaw closing cam of the invention positioned as in Fig. 5.

Figs. 6, 7, 8 and 9 show the individual cams on the cam shaft 49 as these are located at the instant the motor is started. Fig. 7 shows the pressure valve 116 as closed. Fig. 8 shows the exhaust valve 117 as open but it is just about to be closed. Fig. 9 shows the jaw closing cam 149 disposed substantially horizontally about 90° from the position in which it closes the jaw 81 and which is illustrated in Fig. 12.

Referring again to Fig. 9, it is seen that at the start of the operation, the finger 163 on the cam 149 is caught by the latch 172 so that as the shaft 49 rotates the cam 149 is rotated with this. This continues until the cam 149 is lifted into erect position as shown in Fig. 12 whereby it contacts the jaw roller 109 in supporting position beneath this. When so positioned, the cam 149 holds the jaw 81 pressed firmly downwardly against the jaw 55.

Figure 11:
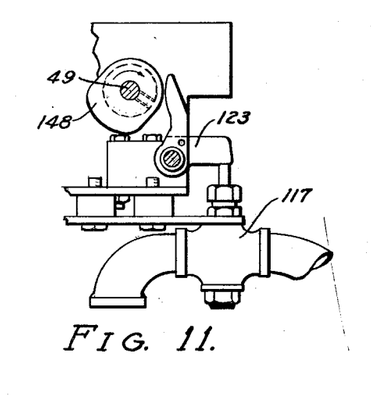
Figure 12:
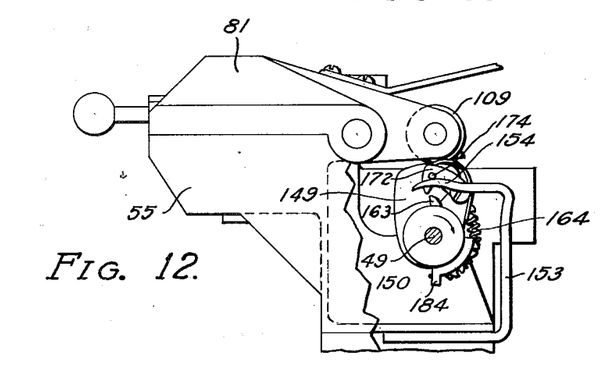

As the cam 149 approaches its erect position, shown in Fig. 12, the latch pin 174 engages and rides upwardly onto the fixed cam 154 as shown in full lines in Fig. 12 and in dotted lines in Fig. 22. This lifts the latch 172 out of engagement with the pin 163 thereby causing the cam 149 to halt in erect position while the shaft 49 continues to rotate. It will be noted in Figs. 10 and 11 that when this takes place the cam 147 is just about to open the pressure valve 116 while the cam 148 allows the exhaust valve 117 to remain closed.

Figure 10:
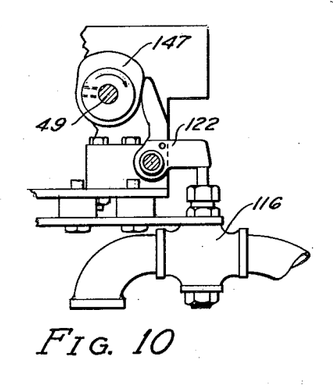
Figs. 10, 11, and 12 are views similar respectively to Figs. 7, 8, and 9 and show the cams of the latter figures positioned as at the moment the jaw closing cam is released in jaw closing position.
Figures 13, 14, 15:
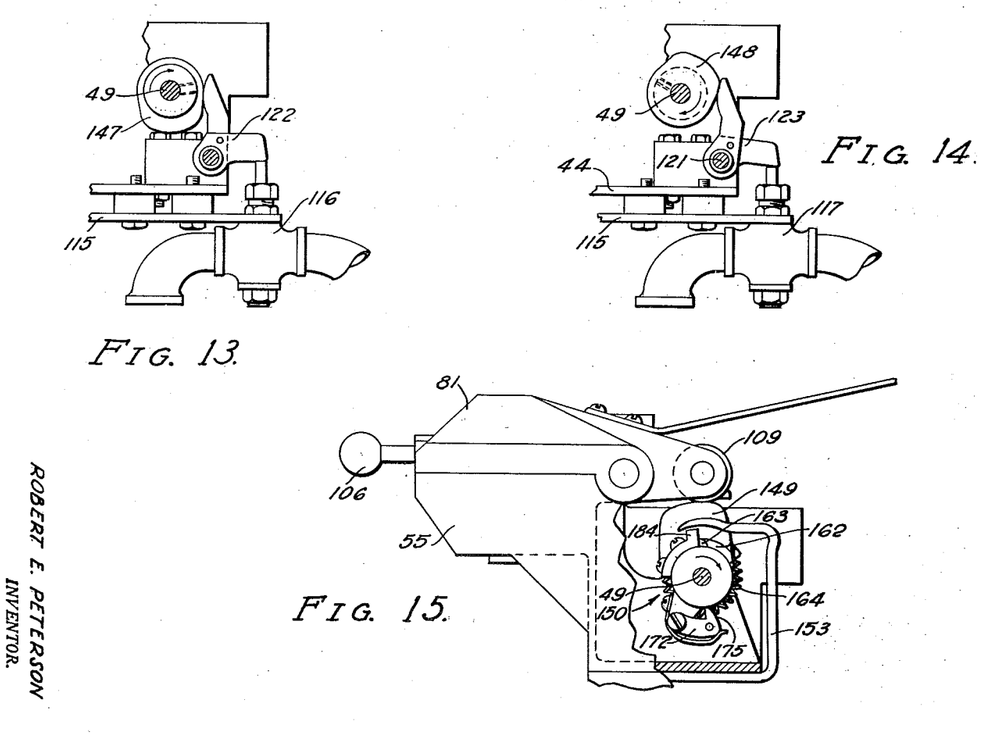
Figs. 13, 14 and 15 are views similar respectively to Figs. 7, 8, and 9 and illustrate the cams shown therein positioned as at the moment when movement of the jaw closing cam is resumed.

From the position shown in Figs. 10, 11 and 12, the cam shaft and elements fixed thereto rotate approximately 180° to the positions in which these are shown in Figs. 13, 14 and 15 before movement of the cam 149 is resumed. This takes place when the lug 181 of the device 150 which is fixed on the shaft 49 catches up with and engages the arcuate plate 162 on the hub of the cam 149 as shown in Fig. 15.

At this point in the operation, it is noted in Fig. 13 that the pressure valve 116 has just been closed by the cam 147 while the cam 148 is just opening the exhaust valve 117. Thus, during 180° of rotation of the cam shaft 49, while the cam 149 has remained stationary in erect position tightly closing the upper jaw 81 against the lower jaw 55, the exhaust valve 117 has been closed and the pressure control valve 116 has been open.

As this period ends, however, and just before the cam 149 is swung by the device 150 out from closing relation with the roller 109, the pressure valve 116 is closed and the exhaust valve 117 opens. Thus, before the jaw 81 is released the pressure of the fluid delivered to the upper and lower jaws is released by the closing of the pressure valve 116 and the opening of the exhaust valve 117.

Figures 16, 17, 18, 19:
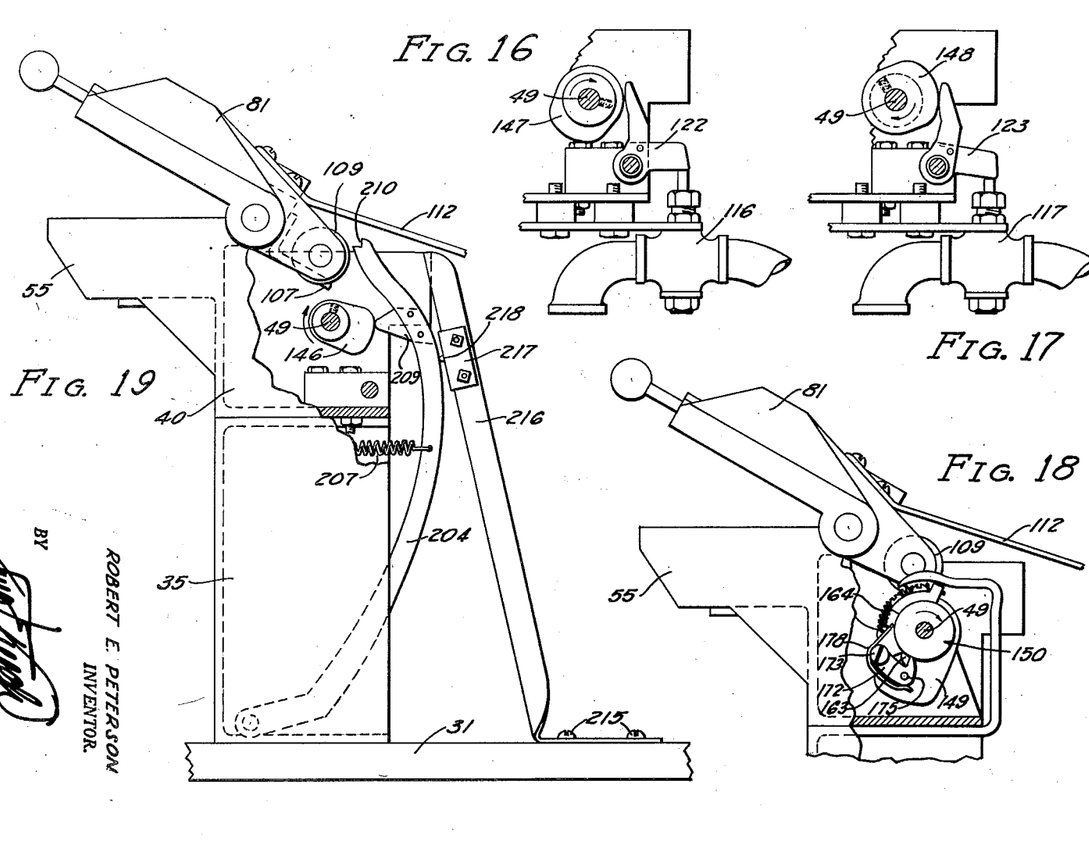
Figs. 16, 17, and 18 are views similar respectively to Figs. 7, 8 and 9 and illustrate the cams shown therein as these are disposed a moment after the jaw closing cam is rotated out of jaw closing position and just as this cam is relatched in positive rotative relation with the cam shaft.
Fig. 19 is a view similar to Fig. 6 and shows the switch cam of the invention as located at the same instant of operation as illustrated in Figs. 16, 17 and 18 and showing how this cam holds the switch-operating jaw-latch lever of the invention so that the swingable jaw of the invention may return to its open inoperative position at the moment the jaw closing cam is rotated out of jaw closing position.

The position of the cam shaft 49 and the elements fixed thereon a moment after the cam 149 is swung out from its supporting relation with the roller 109 is shown in Figs. 16, 17, 18 and 19. Figs. 16 and 17 show the pressure valve 116 closed and the exhaust valve 117 open. Fig. 18 illustrates how the cam 149, which is freely rotatable on the shaft 49, has, as it moved out from under the roller 109, been swung downwardly by its own weight and by the tension of the coil spring 164 so that when the finger 163 engages the rounded nose 175 of the latch 172, it swings this latch outwardly about its pin 173 until the finger 163 passes inside this latch and is trapped by the latch spring 178 pressing the latch inwardly over the finger 163. The cam 149 is thus reconnected to the device 150 in the same relation therewith as at the start of the operation although the rotation of the cam shaft 149 and the parts fixed thereon has not yet ceased.

Figure 1:
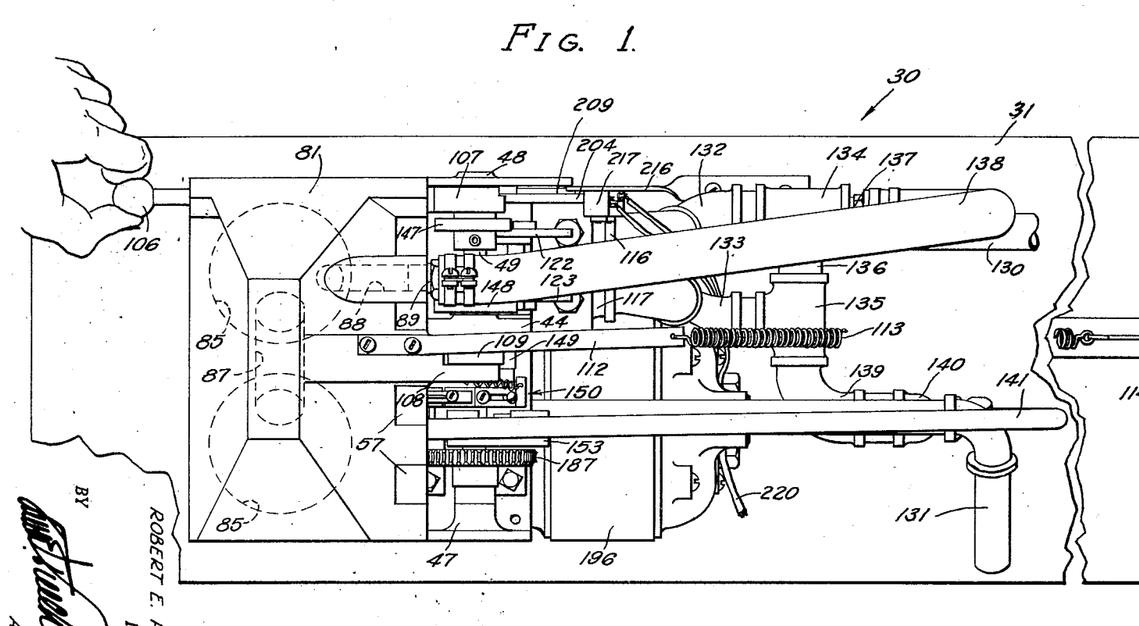
Fig. 1 is a plan view of a preferred embodiment of the apparatus of my invention with the upper swingable jaw thereof manually closed downwardly against the lower fixed jaw thereof as when starting a juice extracting operation.
Figure 2:
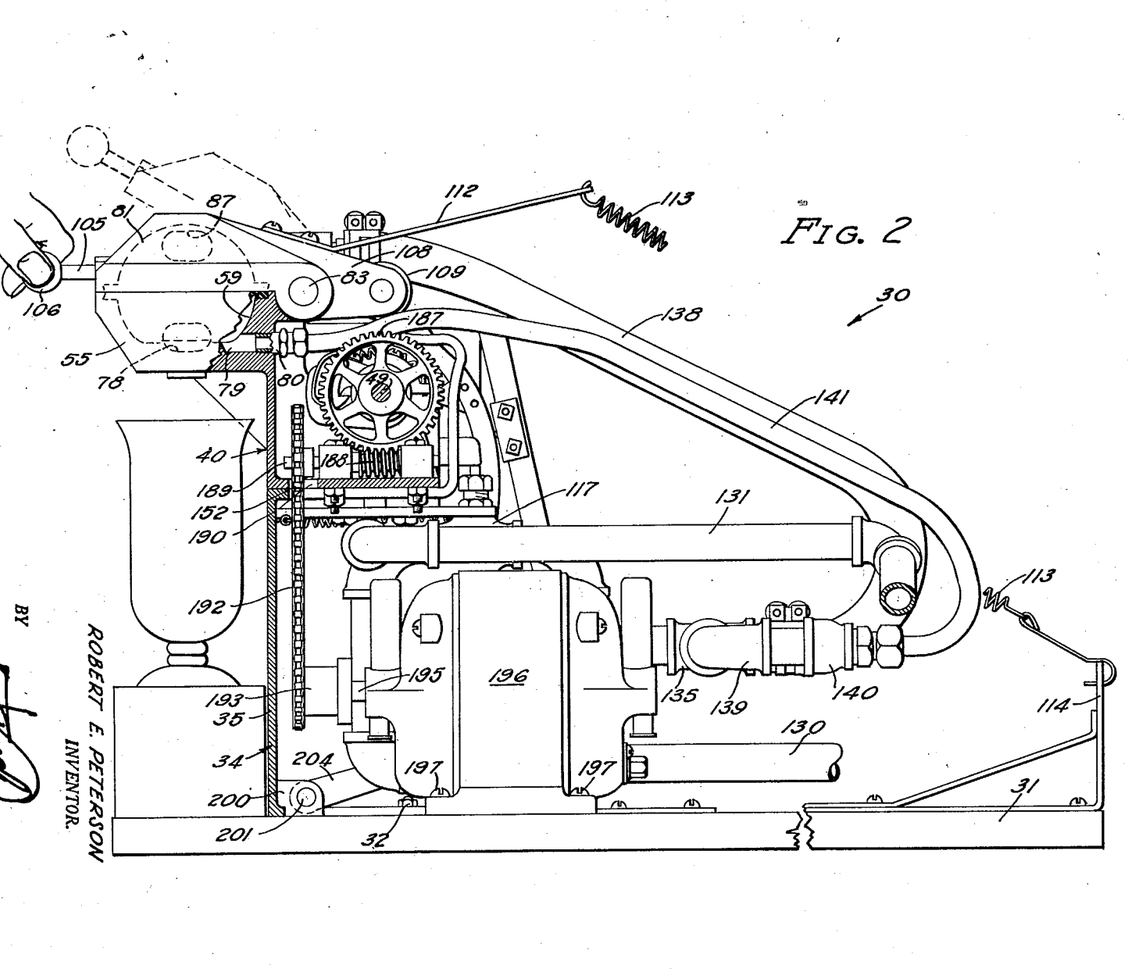
Fig. 2 is a left-side elevational view of Fig. 1 with the frame partially broken away to illustrate the interior mechanisms.
Figure 3:
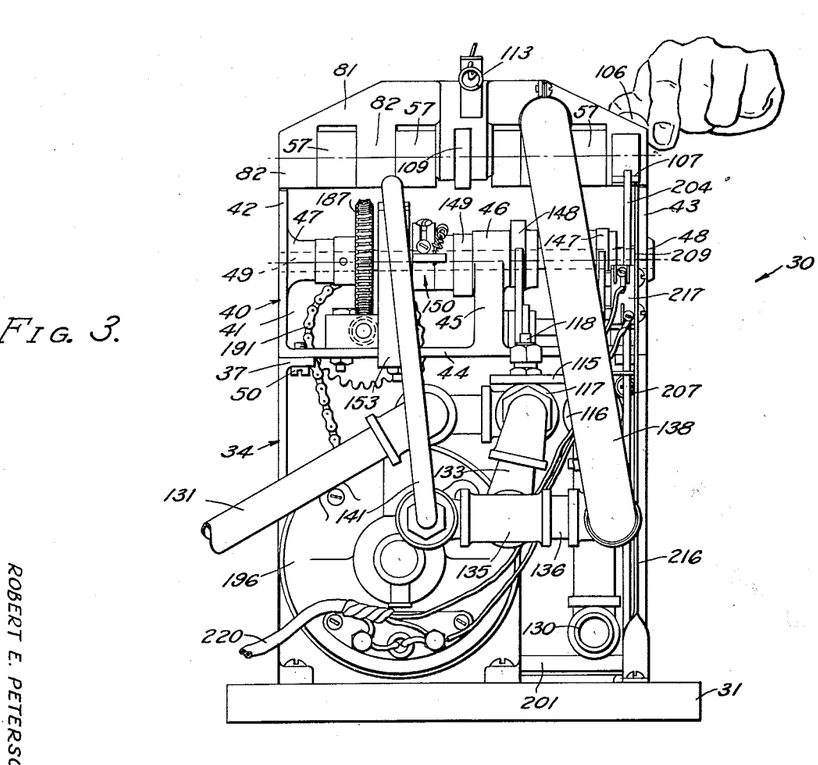
Fig. 3 is a rear elevational view of Fig. 2.
Figure 4:
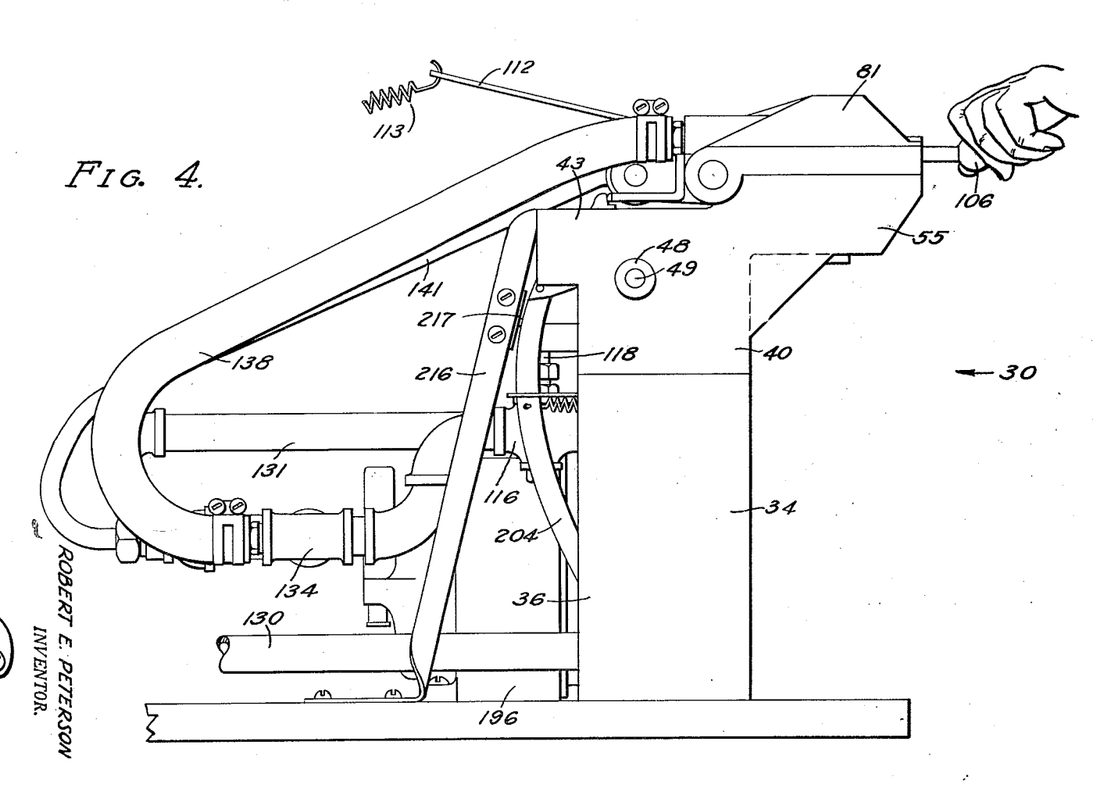
Fig. 4 is a right side elevational view of Fig. 1.

As soon as the cam 149 rides out from under the roller 109 the spring 113 pulling on the arm 112 as shown in Fig. 2 rocks the upper jaw 81 into its upward open position shown in broken lines in that figure. This is also shown in full lines in Fig. 19 where it is seen that cam 146 has rotated into engagement with the lug 209 so as to rock the arm 204 away from the dog 107, thereby freeing the later from the notch 210 whereby the jaw 81 may swing into its upward position when the cam 149 moves out from under the roller 109.

Rotation of the cam shaft 49 a slight distance further swings the cam 146 downwardly as shown in Fig. 20 permitting the lug 209 and arm 204 carrying this to shift inwardly towards the shaft 49 a sufficient distance to relax the pressure of this arm against the switch button 218 enough to open this switch, thereby de-energizing the motor 196. The motor then coasts to a stop which causes the shaft 49 to rotate the amount indicated by the difference between the position of the cam 146 in Fig. 20 and the position of this cam in Fig. 5.

As the mechanism of the juice extractor 30 comes to a standstill, a single cycle of operation has been completed. In this cycle of operation practically all of the juice in the oranges O has been extracted therefrom leaving only collapsed carcasses of the oranges, mainly comprised of the rind and membranous pulp of the latter, which are removed by hand from the machine. The machine is now ready to start another juice extracting operation just like the one above described.

When the upper jaw 81 is first closed manually, the dog 107 catches in the notch 210 of the arm 204 which prevents the re-opening of the jaw 81 so that it is unnecessary for the operator to continue to hold the jaw 81 down in order to cause the extractor 30 to continue its cycle of operation in extracting the juice from the oranges O.

Figure 24:
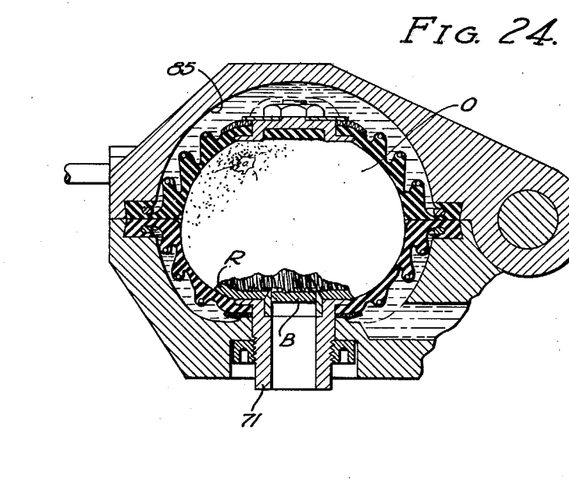

Lowering the upper jaw 81 on these oranges presses these oranges downwardly on the juice nozzle 75 so as to cut a button B (Fig. 24) from the rind R of the orange O and thereby form a hole in the rind through which the juice may be extracted from the whole fruit without permitting juice to escape elsewhere through the rind. Fig. 24 shows the orange O thus impaled upon the juice nozzle 75 and with the diaphragms 62 and 90 pressed into close conformity with the rind of the orange O by the initial introduction of liquid under pressure into the pressure chambers formed by the recesses 58 and 85 of the device.

This figure shows how the rind is supported at all points outside the area of the button B by substantially uniform forces applied through a fluid medium. An increase in the pressure applied to the orange O under these conditions can only result in the breaking down of the cellular membranous juice bearing structure enclosed within the rind, to release the juice therefrom and force this juice along with the button B downwardly through the juice tube 71.

Figure 25:
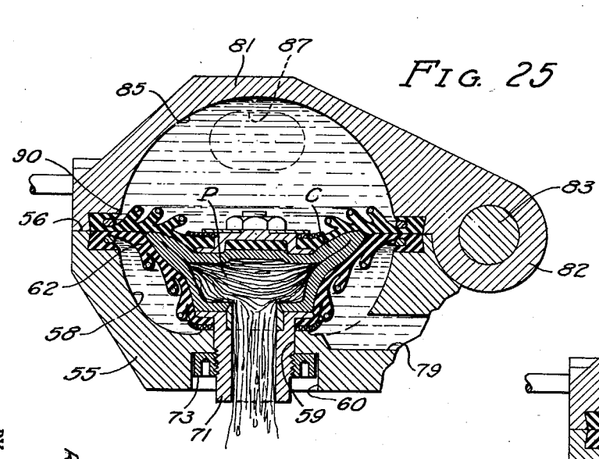
Fig. 25 is a view similar to Fig. 24 and illustrates the result of continuing to introduce liquid under high pressure into the pressure chambers. The orange is shown as having been constricted and practically all of the juice forced therefrom leaving only a relatively small space within the rind of the fruit which is occupied principally by membranous pulp.

The supporting of the rind R of the orange O as shown in Fig. 24 and then continuing to introduce liquid under high pressure into the pressure chambers of the jaws 55 and 81 has exactly this result and quickly reduces the orange to a biscuit shaped carcass C as shown in Fig. 25. While the rind R is not shown as fully collapsed together in the carcass C, it is to be understood that the space remaining inside the rind in Fig. 25 is filled with membranous pulp and that the machine 30 is capable of applying pressure to whatever degree necessary to substantially clean this pulp of juice.

Figure 26:
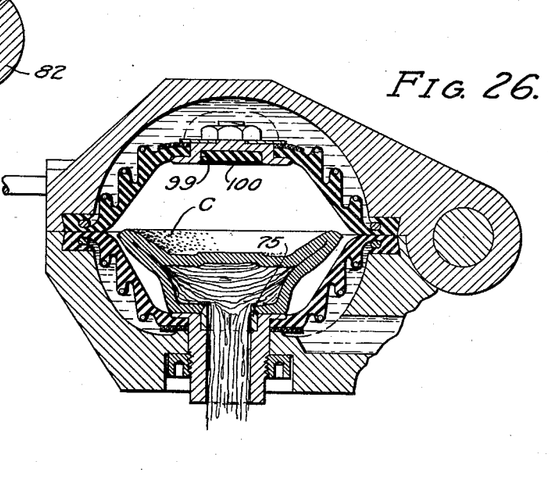
Fig. 26 is a view similar to Fig. 25 showing the diaphragms relaxed just after pressing the juice from an orange and illustrates the appearance of the latter when it is removed from the machine.

When the pressure valve 116 is shut off and the exhaust valve 117 is opened just before the jaw 81 opens, the diaphragms 62 and 90 spring back into their normal shapes as shown in Fig. 26. With the opening of the jaw 81, the carcasses C may be readily lifted manually from the lower pressure cups and replaced with whole oranges O in preparation for another juice extraction operation.

The rubber disc 100 occupies the space in the recess 99 and is uncompressible so as to apply pressure to the rind of the fruit during the juice extracting operation. In the event the machine 30 is operated without a piece of fruit in one of the pairs of juice extraction cups, the upper diaphragm 90 will be forced downwardly to conform with the lower diaphragm 62 by the pressure of fluid thereagainst and the rubber disc 100 will permit the annular knife edge of the juice nozzle 75 to extend thereinto until the flange of button 95 moves down into contact with the flange 72 of the juice tube 71. The rubber disc 100 is therefore not cut by the sharp edge of the nozzle 75 yet when this disc engages an orange, as above stated, in a juice extracting operation it does not permit the rind of the fruit to be pressed a substantial distance into the recess 99.

The annular ribs 67 and 93 which are formed outwardly on the diaphragms 62 and 90 perform the function of strengthening these diaphragms and of rapidly returning the diaphragms to their normal configuration following the release of the water pressure against these diaphragms by the opening of the exhaust valve 117.

I claim:

1. A method of extracting juice from a whole citrus fruit which comprises: forming a hole in the rind of said fruit, applying uniform compressive forces through a fluid medium to closely spaced points in all areas of said rind outside the area of said hole, to support the rind of said fruit against local outward bursting, and increasing the pressure of said fluid medium to decrease the volume of the space within the boundaries of said support and thereby force the juice from said fruit out of said hole.

2. An apparatus for extracting juice from a whole citrus fruit which comprises: means for forming an opening in the rind of said fruit; flexible rind supporting walls; and fluid pressure means for compressively contracting said walls to bring said walls into conformity with said rind outside the area of said opening at points so closely spaced as to provide adequate support against local outward bursting of the juice bearing structure of said fruit excepting in the aforesaid area and then apply uniform compressive forces to said rind at all of the aforesaid points to reduce the volume of the space within the boundaries of said walls and thereby force the juice from said juice structure out of said opening.

3. A method of extracting juice from a fresh whole citrus fruit which comprises: forming an opening in the rind of the fruit for the escape of juice therefrom, applying compressive forces through a fluid medium to the exterior of the fruit to progressively reduce its volume and expel the juice from said opening, and distributing said compressive forces through said fluid medium to simultaneously bear on substantially the entire area of the rind, excepting the area of said opening, whereby they also serve to provide sufficient support to the rind to prevent the juice from bursting therethrough.

4. A method of expressing juice from whole citrus fruit which comprises: forming a hole in the rind of said fruit, substantially surrounding said fruit with a fluid medium and constricting said fruit to reduce the volume thereof and express a relatively large portion of the juice therein outwardly through said hole by applying pressure uniformly through said medium to all portions of the rind of said fruit outside the area of said hole, said pressure being applied at sufficiently closely spaced points to prevent an unsupported outward bulging of the rind and juice bearing structure between two of such points.

5. In a device for extracting the juice from a whole citrus fruit, the combination of: means for forming an opening in the rind of said fruit; a pair of flexible diaphragms; and fluid pressure means for applying said diaphragms to opposite hemispheres of a whole citrus fruit and applying compressive forces through said diaphragms to said fruit to constrict said fruit to reduce its volume and force the juice outwardly therefrom through said opening.

6. In a device for extracting juice from a whole orange the combination of: a tube adapted to be inserted in the rind of said orange to form a juice passage therein, said tube being open at its upper end to receive a button cut thereby from the rind; flexible diaphragm means; and fluid pressure means for applying said diaphragm means to the exterior of said fruit, outside the area in which said tube penetrates the same, to constrict said fruit to force the juice therefrom outwardly through said tube.

7. In a device for extracting juice from a whole orange the combination of: a tube adapted to be inserted in the rind of said orange to form a juice passage therein, said tube being open at its upper end to receive a button cut thereby from the rind; flexible diaphragm means; and fluid pressure means for applying said diaphragm means to the exterior of said fruit outside the area in which said tube penetrates the same to constrict said fruit to force the juice therefrom outwardly through said tube, the lower portion of said tube where it extends into said fruit during the pressing operation being imperforate so as to make a seal between said tube and the rind which prevents the outward escape of juice during the pressing operation.

8. In a device for extracting the juice from a whole citrus fruit, the combination of: a pair of flexible support means adapted for pressurally contacting opposite hemispheres of said fruit in close conformity with said hemispheres thereby adequately supporting the rind of said fruit against local outward bursting of the juice bearing structure of said fruit through said rind; a tube adapted to be inserted in the rind of said fruit to form a juice passage therein, said tube being open at its inner end to receive a button cut thereby from the rind; and means for applying said support means to said fruit hemispheres to support said rind as aforesaid and then while maintaining said support, further press said support means together to reduce the volume of the space occupied by said fruit and thus expel the juice therefrom through said tube.

9. A method of extracting juice from a whole citrus fruit which comprises: forming a hole in the rind of said fruit; and applying uniform compressive forces through a fluid medium to closely spaced points in all areas of said rind outside the area for said hole, to support the rind of said fruit against local outward bursting and, while maintaining said support, decrease the volume of the space within the boundaries of said support to force the juice out of said hole.

10. A method of extracting juice from a whole citrus fruit which comprises: forming an opening in the rind of said fruit; providing support for all areas of said rind outside the area of said opening which is adequate to prevent local outward bursting of the juice-bearing structure through the rind when said structure is subjected to relatively high internal pressure; and then, while maintaining said support, suddenly compressively reducing the volume of the space within the boundaries of said support to a small fraction of what it formerly was to produce such a high internal pressure as to quickly force a high percentage of the juice from said structure out of said opening.

11. In a method of extracting juice from a whole citrus fruit in which a relatively small hole is formed in the rind of a whole fruit, the steps of: providing adequate support against local outward bursting of the juice-bearing structure of said fruit under conditions of relatively high internal pressure by the application of compressive forces to closely spaced points in all areas of said rind outside the area for said hole; and, while maintaining said support, quickly and substantially uniformly increasing said compressive forces to rapidly reduce the volume of the space within the boundaries of said support to a small fraction of what it formerly was to produce such a high internal pressure as to force a major portion of the juice from said juice structure towards and out of said hole.

12. In a device for extracting the juice from a whole citrus fruit, the combination of: a pair of support means adapted for pressurally contacting opposite hemisphere of said fruit to cause said hemispheres to closely conform respectively to said support means and thereby adequately support the rind of said fruit against local outward bursting of the juice-bearing structure of said fruit; means adapted to form a hole in said rind when said fruit is pressed thereagainst; and means for applying said support means to said fruit to press said fruit against said hole-forming means to form a hole in said rind, and for pressing said support means against said fruit to cause said support means to support said rind as aforesaid and, while maintaining said support, to reduce the volume of the space occupied by said fruit between said support means and thus expel juice therefrom through said hole.

13. In a device for extracting the juice from a whole citrus fruit, the combination of: a pair of support means adapted for pressurally contacting opposite hemispheres of said fruit to cause said hemispheres to closely conform respectively to said support means and thereby adequately support the rind of said fruit against local outward bursting of the juice-bearing structure of said fruit; means adapted to form a hole in said rind when said fruit is pressed thereagainst; and means for applying said support means to said fruit to press said fruit against said hole-forming means to form a hole in said rind, and for pressing said support means against said fruit to cause said support means to support said rind as aforesaid and, while maintaining said support, to reduce the volume of the space occupied by said fruit between said support means and thus expel juice therefrom through said hole, said hole-forming means being mounted on one of said hemisphere support means.

14. In a device for extracting the juice from a whole citrus fruit, the combination of: a pair of support means adapted for pressurally contacting opposite hemispheres of said fruit to cause said hemispheres to closely conform respectively to said support means and thereby adequately support the rind of said fruit against local outward bursting of the juice-bearing structure of said fruit through said rind excepting in a given restricted area; means for forming a hole in said fruit in said area; and means for applying said support means to said fruit hemispheres to support said rind as aforesaid and then while maintaining said support, further press said support means together to reduce the volume of the space occupied by said fruit between said support means and thus expel juice therefrom through said hole.

15. An apparatus for extracting juice from a whole citrus fruit which comprises: means forming an opening in the rind of said fruit; rind supporting walls; and means for compressively moving said walls towards said fruit to bring said walls into contact with said rind, outside the area of said opening, at points so closely spaced apart as to provide adequate support against local outward bursting of the juice-bearing structure of said fruit, excepting in the aforesaid area, and then contracting said walls about said fruit to apply uniform compressive forces to said rind at all of the aforesaid points and to thereby reduce the volume of the space within the boundaries of said walls to force the juice from said juice structure out of said opening.

16. A method of expressing juice from whole citrus fruit which is applicable to relatively fresh fruit in which the fruit is firm and the rind tender, which comprises: forming a hole in the rind of said fruit, and constricting said fruit to reduce the volume thereof and express a relatively large portion of the juice therein outwardly through said hole by simultaneously applying substantially uniform and constantly increasing compressive forces to all portions of the rind of said fruit outside the area of said hole at points sufficiently close to prevent an unsupported outward bulging of the rind and juice-bearing structure between two of such points.

17. A method of extracting juice from whole citrus fruit which is applicable to relatively fresh fruit in which the fruit is firm and the rind tender and which comprises: forming a hole in the rind of said fruit, establishing forces supporting the rind of the fruit outside the area of said hole to prevent outward bursting of the juice-bearing structure of the fruit by not allowing any unsupported outward fold in the rind, and then continually and uniformly increasing said forces and moving the points of application thereof inwardly so as to maintain support of said rind as aforesaid as the fruit is condensed by said forces up to the point where said juice-bearing structure is crushed and compressed into a relatively small space and a relatively large portion of the juice in the fruit is expelled therefrom through said hole.

18. A method of extracting juice from whole citrus fruit which is applicable to relatively fresh fruit in which the fruit is firm and the rind tender and which comprises: forming a hole in the rind of said fruit; completely enveloping said fruit by supporting media, applying said media to all portions of the rind of said fruit outside the area of said hole to produce compressive forces supporting said rind against outward bursting of the juice-bearing structure by not allowing any unsupported outward fold in the rind, and then constricting said supporting media about said fruit to continually and substantially uniformly increase said forces while following the rind inwardly with said media and consistently maintaining support of the rind as aforesaid, up to the point where said juice-bearing structure is crushed and compressed into a relatively small space and a relatively large portion of the juice in the fruit is expelled therefrom through said hole.

19. The method of extracting juice from a fresh whole citrus fruit which comprises the steps of forming an opening in the rind of the fruit for the escape of juice therefrom, applying compressive forces to the exterior of the fruit to progressively reduce its volume and expel the juice from said opening, and distributing said compressive forces to simultaneously bear on substantially the entire area of the rind whereby they also serve to provide sufficient support to the rind to prevent the juice from bursting therethrough.

20. A method of extracting juice from whole citrus fruit which comprises: applying compressive forces to all portions of the rind of said fruit outside a given restricted area of said rind, and cutting a button from said rind comprising the rind in said area, said compressive forces being substantially uniform and applied at points sufficiently close to each other as to prevent the juice-bearing structure exploding outwardly through said rind yet producing an internal pressure in said fruit sufficient to break down the juice-bearing structure within said fruit, expel said button outwardly forming a juice passage in said rind, and express a relatively large portion of the juice in said juice-bearing structure outwardly through said passage.

21. An apparatus for extracting juice from whole citrus fruit comprising a fruit supporting cup, an annular knife disposed in the bottom of said cup, said knife being open axially to admit thereto a button cut thereby from the rind of said fruit; means for compressing a piece of fruit disposed in said cup to cause said knife to penetrate axially the rind of the fruit and to apply compressive forces uniformly and simultaneously to the entire rind of said fruit outside the area within said knife, said forces supporting said rind against the outward bursting thereof as the internal pressure of the juice-bearing structure within said fruit increases, said compressive forces raising said pressure sufficiently to expel the juice from said structure together with a button of the rind formed by said knife outwardly through said knife, the outer surface of said knife being tapered sufficiently to produce a tightly pressed fit between said knife and the hole formed thereby in the rind, said taper being insufficient, however, to split the rind adjacent said hole when said fruit is impaled on said knife.

22. An apparatus for extracting juice from a whole citrus fruit which comprises. a pair of cups comprising flexible diaphragms; means disposed axially in one of said cups for providing a hole in the rind of said fruit when said fruit is pressed thereagainst; means for mounting said cups, forming pressure chambers outside these, and for bringing said cups together to enclose said fruit and press said fruit against said hole forming means; and means for locking said cups together whereby the delivery of fluid under pressure to said chambers causes said diaphragms to conform closely to the rind of said fruit and to constrict said fruit to force the juice therefrom outwardly through the hole formed in the rind thereof by said hole forming means.

23. An apparatus for extracting juice from a whole citrus fruit which comprises: a pair of cups comprising flexible diaphragms; a rind penetrating nozzle provided axially in one of said cups; means for mounting said cups, forming pressure chambers outside these, and for bringing said cups together to enclose said fruit and impale the latter on said nozzle; and means for locking said cups together whereby the delivery of fluid under pressure to said chambers causes the said diaphragms to conform closely to the rind of said fruit and constrict said fruit to force the juice therefrom through the opening in said rind formed by said nozzle.

24. An apparatus for extracting juice from a whole citrus fruit which comprises: means for forming an opening in the rind of said fruit; a pair of flexible diaphragms; means for bringing said diaphragms together to enclose said fruit; fluid pressure means for forcing said diaphragms into close conformity with the rind of said fruit and constricting said fruit to reduce its volume and force the juice therein outwardly through said opening; and means automatically operative when set in motion to lock said diaphragms in fruit enclosing relation, actuate said fluid pressure means to express the juice from said fruit, relax said fluid pressure means to permit said diaphragms to resume their normal condition, and to separate said diaphragms.

25. A combination as in claim 24 in which said operating means is set in motion by manually bringing said diaphragms together to enclose a piece of fruit.

26. In a device for extracting the juice from a whole citrus fruit, the combination of: a pair of fruit compressing cups; means for bringing said cups together to enclose said fruit; a short circular cutter forming a juice nozzle which is mounted in one of said cups, said fruit being impaled on said nozzle by bringing said cups together, thereby cutting a button from the rind of said fruit; means for continuing to press said cups against said fruit to constrict the latter and force said button and the juice of said fruit outwardly through the hole formed by said cutter.

27. In a device for utilizing fluid pressure for extracting the juice from a whole citrus fruit, the combination of: a soft rubber diaphragm formed in the shape of a cup; and a series of spaced reinforcing ribs formed integrally with and extending outwardly from said diaphragm to strengthen the latter and assist in the restoration of said diaphragm to its normal configuration when the pressure thereon is released.

28. In a device for utilizing fluid pressure for extracting the juice from a whole citrus fruit, the combination of: a soft rubber diaphragm formed in the shape of a cup; and a series of reinforcing annular ribs formed integrally with and extending outwardly from said diaphragm and concentric with the axis of the latter, for reinforcing said diaphragm and aiding in the return of the latter to its normal configuration when the pressure thereon is released.

29. In a device for extracting the juice from a whole citrus fruit, the combination of: a pair of cups comprising flexible diaphragms, there being a hole formed axially in each of said diaphragms; an annular hole forming cutter mounted in the central hole in one of said diaphragms; a button mounted in said hole of the other said diaphragms; means for bringing said diaphragms together to enclose said piece of fruit; means for applying fluid pressure to said diaphragms to cause the latter to conform to the rind of said fruit, impale said fruit on said cutter, and force the juice in said fruit outwardly through the hole formed by said cutter; and cushion means provided in said button which transmits said fluid pressure to the area of said fruit contacted thereby in a juice pressing operation but which is adapted to engage said cutter when said fluid pressure is applied without a piece of fruit being enclosed by said cups and thereby protect said cutter from damage.

30. A combination as in claim 27 in which said reinforcing ribs are strengthened by flexible filamentary reinforcing material united with outer edges of said ribs.

ROBERT E. PETERSON.